United States Patent
Tsai et al.

(10) Patent No.: US 8,059,132 B2
(45) Date of Patent: Nov. 15, 2011

(54) DIGITAL PHOTO FRAME CAPABLE OF DISPLAYING IMAGES ASYNCHRONOUSLY AND METHOD THEREOF

(75) Inventors: Ming-Feng Tsai, Taipei Hsien (TW);
Cheng-Hao Chou, Taipei Hsien (TW);
Kuan-Hong Hsieh, Taipei Hsien (TW);
Xiao-Guang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 577 days.

(21) Appl. No.: 12/268,455

(22) Filed: Nov. 11, 2008

(65) Prior Publication Data

US 2010/0020089 A1      Jan. 28, 2010

(30) Foreign Application Priority Data

Jul. 24, 2008   (CN) .......................... 2008 1 0302983

(51) Int. Cl.
*H04N 1/50*   (2006.01)
*G09G 5/00*   (2006.01)
*G09G 5/42*   (2006.01)
*G09G 5/36*   (2006.01)
*G06F 17/00*  (2006.01)
*A47G 1/00*   (2006.01)
*A47G 1/14*   (2006.01)
*A47G 1/06*   (2006.01)

(52) U.S. Cl. ............ 345/581; 345/547; 40/426; 40/700; 40/721; 40/739; 428/13

(58) Field of Classification Search ................. 345/581, 345/619, 530, 547, 555–556; 348/36–39; 382/254, 276, 291, 295; 40/426–427, 700, 40/721, 728, 735, 739–741; 428/1.1, 13

See application file for complete search history.

(56) References Cited

U.S. PATENT DOCUMENTS

| | | | |
|---|---|---|---|
| 2008/0301993 A1* | 12/2008 | Lian et al. ........................ | 40/700 |
| 2008/0303751 A1* | 12/2008 | Li et al. .......................... | 345/55 |
| 2009/0167968 A1* | 7/2009 | Hsu et al. ....................... | 349/15 |

* cited by examiner

Primary Examiner — Wesner Sajous
(74) Attorney, Agent, or Firm — Altis Law Group, Inc.

(57) ABSTRACT

A method for displaying images asynchronously is provided. The method includes: providing at least one display mode, the display mode defines a total display area count displayable showed on a display, an interval to display images on the display, and a predetermined displaying manner; obtaining images and the display mode; generating one or more display areas according to the display mode; and displaying the images on the generated display areas according to the interval and displaying manner.

14 Claims, 4 Drawing Sheets

DIGITAL PHOTO FRAME CAPABLE OF DISPLAYING IMAGES ASYNCHRONOUSLY AND METHOD THEREOF

FIELD OF THE INVENTION

The disclosure relates to a digital photo frame capable of displaying images asynchronously and method thereof.

DESCRIPTION OF RELATED ART

Digital images play an important role in the lives of many people, and digital photo frames are capable of displaying digital images in various manners. For example, digital photo frames are able to display multiple images on corresponding display areas simultaneously. However, the display areas on display have the same shape, which may be unappealing to many user. Therefore, what is needed is a digital photo frame capable of displaying images asynchronously and method thereof.

SUMMARY

A digital photo frame capable of displaying image asynchronously is provided. The digital photo frame includes: a memory for storing images and display modes, wherein each of the display modes defines a total display area count displayable on a display, an interval to display images on the display, and a predetermined displaying manner; a processor being connected with the memory, comprising: a reading module configured for obtaining images and the display modes from the memory; an assigning module configured for defining one or more display areas on the display according to the display mode; a displaying module configured for displaying the images in the display areas according to the interval and the predetermined displaying manner.

Other advantages and novel features will be drawn from the following detailed description of the preferred embodiment with references to the attached drawings.

BRIEF DESCRIPTION OF THE DRAWINGS

The components of the drawings are not necessarily drawn to scale, the emphasis instead being placed upon clearly illustrating the principles of a digital photo frame. Moreover, in the drawings, like reference numerals designate corresponding parts throughout several views.

DETAILED DESCRIPTION OF THE EMBODIMENTS

Figure 1:
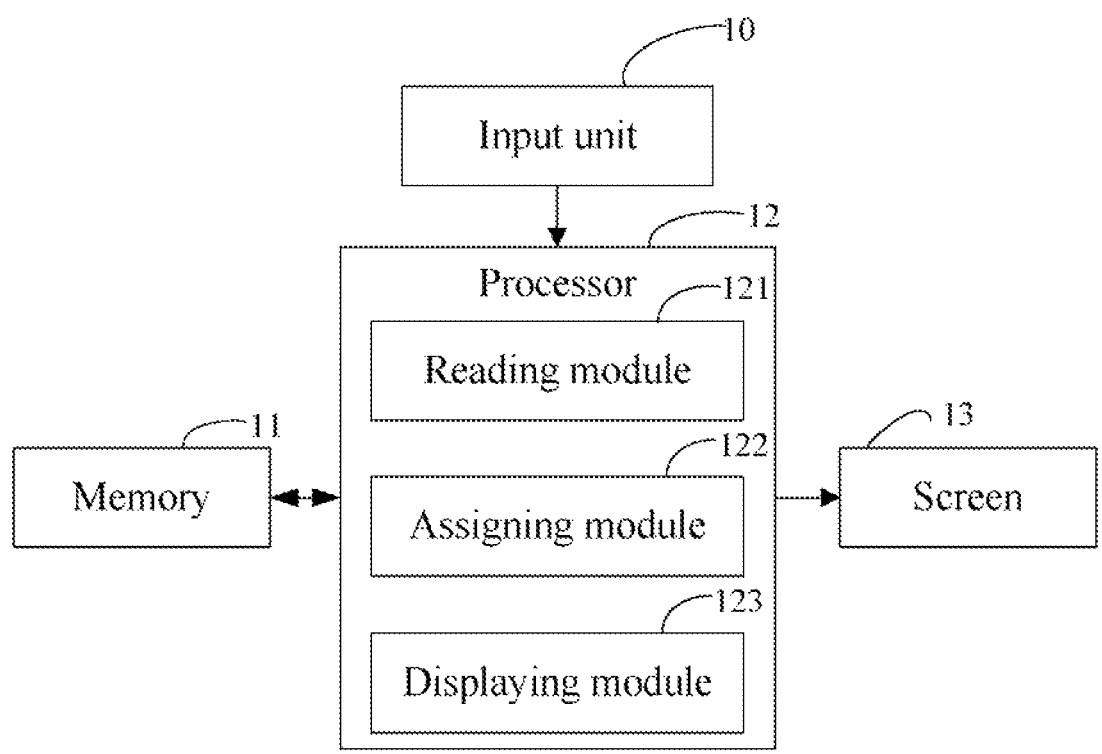
FIG. 1 is a block diagram of a digital photo frame in accordance with an exemplary embodiment.

FIG. 1 is an exemplary block diagram of a hardware infrastructure of a digital photo frame in accordance with an exemplary embodiment. The digital photo frame includes at least one input unit 10, a memory 11, a processor 12, and a display 13.

The memory 11 is configured for storing images and display modes. Each of the display modes defines a total display area count of images displayable on the display 13, an interval to display images on the display 13, and a predetermined displaying manner. The predetermined displaying manner can be a manner of displaying images on the display areas one-by-one according to the interval (see FIG. 3), or displaying images on the display areas in a first-in-first-out manner according to the interval (see FIG. 4). Furthermore, the display modes can also define parameters, such as ratio, brightness, color, and angle view of the image. The display modes can be system default and can also be configured using the input unit 10.

The processor 12, connected with the memory 11 and the display 13, includes a reading module 121, an assigning module 122, and a displaying module 123. The reading module 121 is configured for obtaining images and one of the display modes from the memory 11. The assigning module 122 is configured for defining one or more display areas on the display 13 according to the total display area count defined in the display mode, and assigning the display areas with different frames, wherein the frames may have different designs in shapes, sizes and patterns. Furthermore, for the purpose of understanding exemplary embodiments, the display areas are assigned an order number, for example, the first display area, the second display area, the third display area, the forth display area, and so on. Refer to the exemplary embodiment described below. The displaying module 123 is configured for displaying the images in the display areas asynchronously according to the interval and the predetermined displaying manner.

Figure 3:
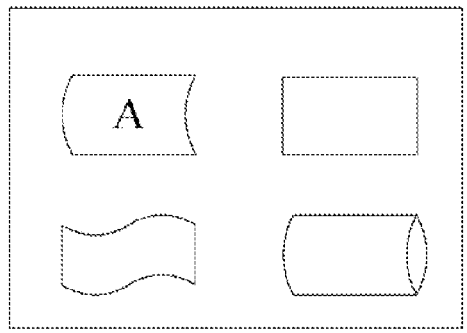
FIG. 3 is an exemplary schematic diagram illustrating an asynchronous displaying process in a one-by-one displaying manner in accordance with an exemplary embodiment.
Figure 3:
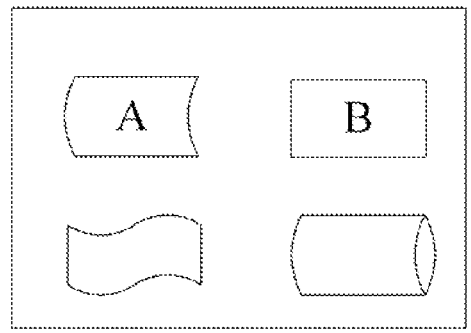
Figure 3:
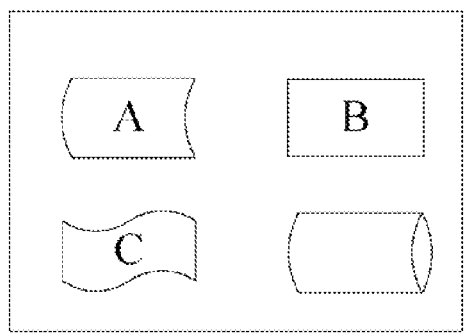
Figure 3:
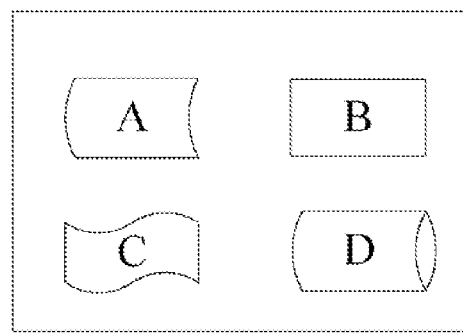
Figure 3:
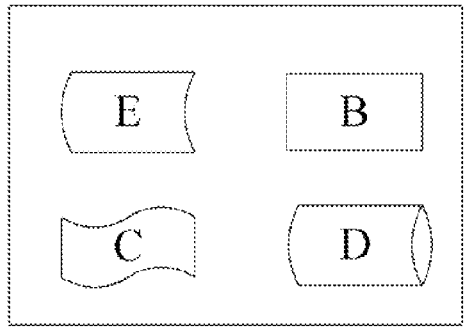
Figure 3:
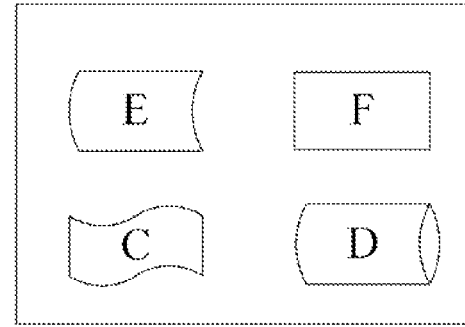

In an exemplary embodiment as shown in FIG. 3, the displaying module 123 displays images in the first displaying manner, wherein the first displaying manner is embodied as the display module 123 displays image A, B, C and D respectively in the first display area, the second display area, the third display area, and the forth display area, one-by-one according to the interval.

Figure 4:
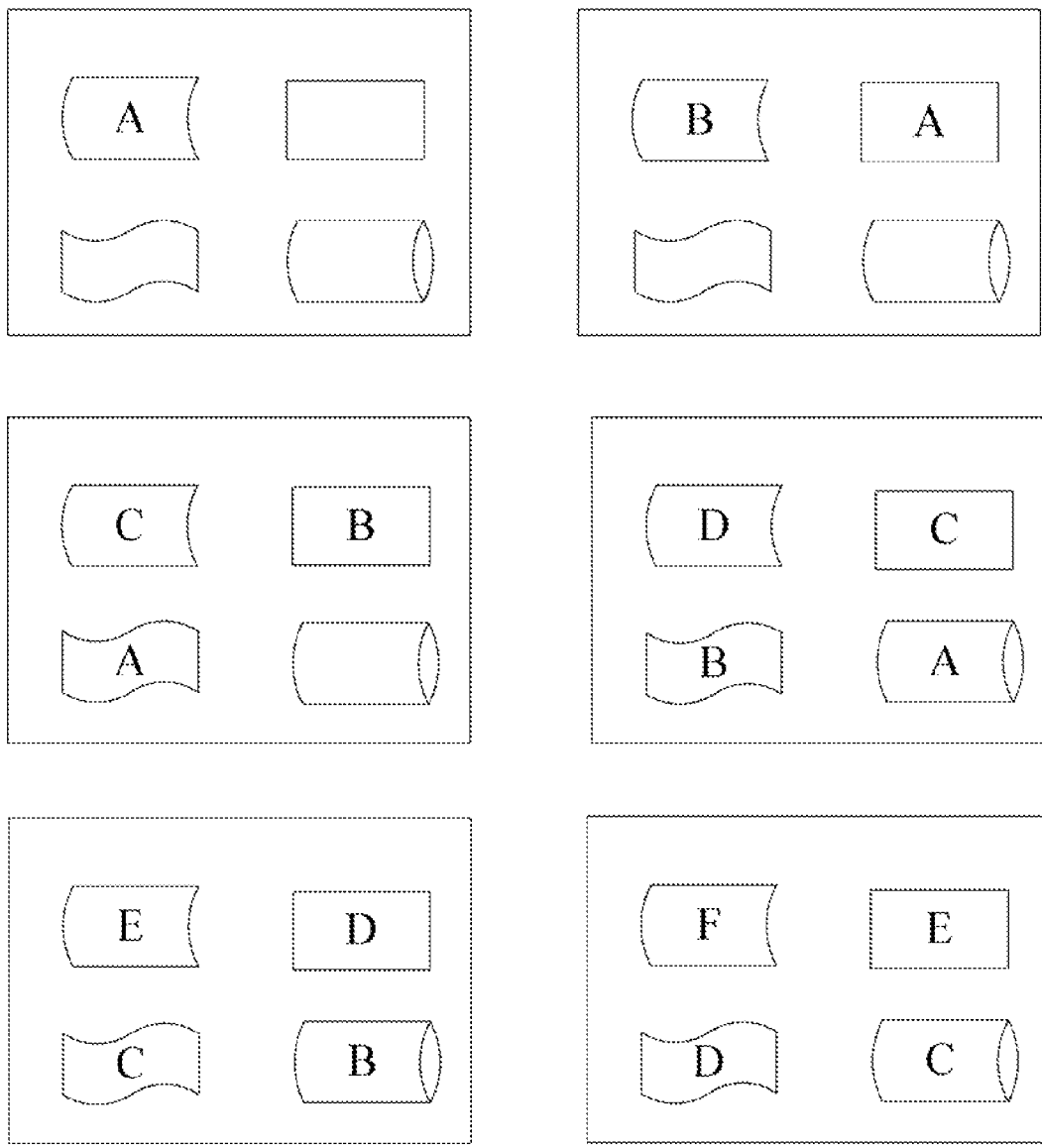
FIG. 4 is an exemplary schematic diagram illustrating an asynchronous displaying process in a first-in-first-out displaying manner in accordance with an exemplary embodiment.

In another exemplary embodiment as shown in FIG. 4, the displaying module 123 displays images in the second displaying manner, wherein the second displaying manner is embodied as the display module 123 displays images A, B, C and D in first-in-first-out manner according to the interval, for example 0.2 seconds(s). Specifically, the display module 123 displays the image A on the first display area; after a first interval of 0.2 (s), the display module 123 displays the image A on the second display area, removes image A from the first display area, and displays the image B on the first display area; after the first predetermined time interval has lapsed again (a second 0.2 s), the display module 123 displays the image A in the third display area, the image B in the second display area, and the image C in the first display area; after a third 0.2 (s), the display module 123 displays the image A in the forth display area, the image B in the third display area, the image C in the second display area, and the image D in the first display area.

If there are images that have not yet been displayed on the condition that all the display areas have images thereon, the display module 123, in an exemplary embodiment, clears up the images on all of the display areas and displays more images that have not yet been displayed on the display areas according to the interval and the predetermined displaying manner; in another exemplary embodiment, the display module 123 substitutes the images on the display areas with the new images according to the interval time and the predetermined displaying manner (see FIG. 3 and FIG. 4), instead of clearing up the images described in the first exemplary embodiment. Therefore, according to the predetermined displaying manner, the display module 123 displays different images on the display 13 asynchronously.

The memory 11 also stores a plurality of system default images. If there are vacant display areas having no images displayed thereon, after the display module 123 displays the last image that has not yet been displayed, the reading module 121 obtains one or more of the system default images, and the display module 123 displays the default system images in the vacant display areas.

For a better understanding the present invention, in an exemplary embodiment, the display mode that is system default, defines the display area count of images displayable on the display 13 as 4, the interval to display images as 0.5 (S), and the predetermined displaying manner as displaying the image of display areas in first-in-first-out manner according to the interval of 0.5 (s), such as shown in FIG. 4.

In another exemplary embodiment, the display mode that is defined by the user, defines the display area count displayable on the display 13 as 4, the interval to display images as 0.2 (S), and the predetermined displaying manner is displaying the image one-by-one, as shown in FIG. 3, according to the interval of 0.2 (s).

When the display module 123 displays the last image that has not yet been displayed, the display module 123 displays a prompt on the display 15 to remind the user that all images have been displayed. The display module 123 further displays another prompt to remind the user whether to repeat displaying the images in the current display mode. If the processor 12 does not receive any operation information in a predetermined time (e.g., 0.5 (s)), the display module 123 repeats displaying the images in the current display mode. If the processor 12 receives the operation information in the predetermined time, the processor 12 defines a new display mode and the display module 123 displays the images according to the new image display mode.

Figure 2:
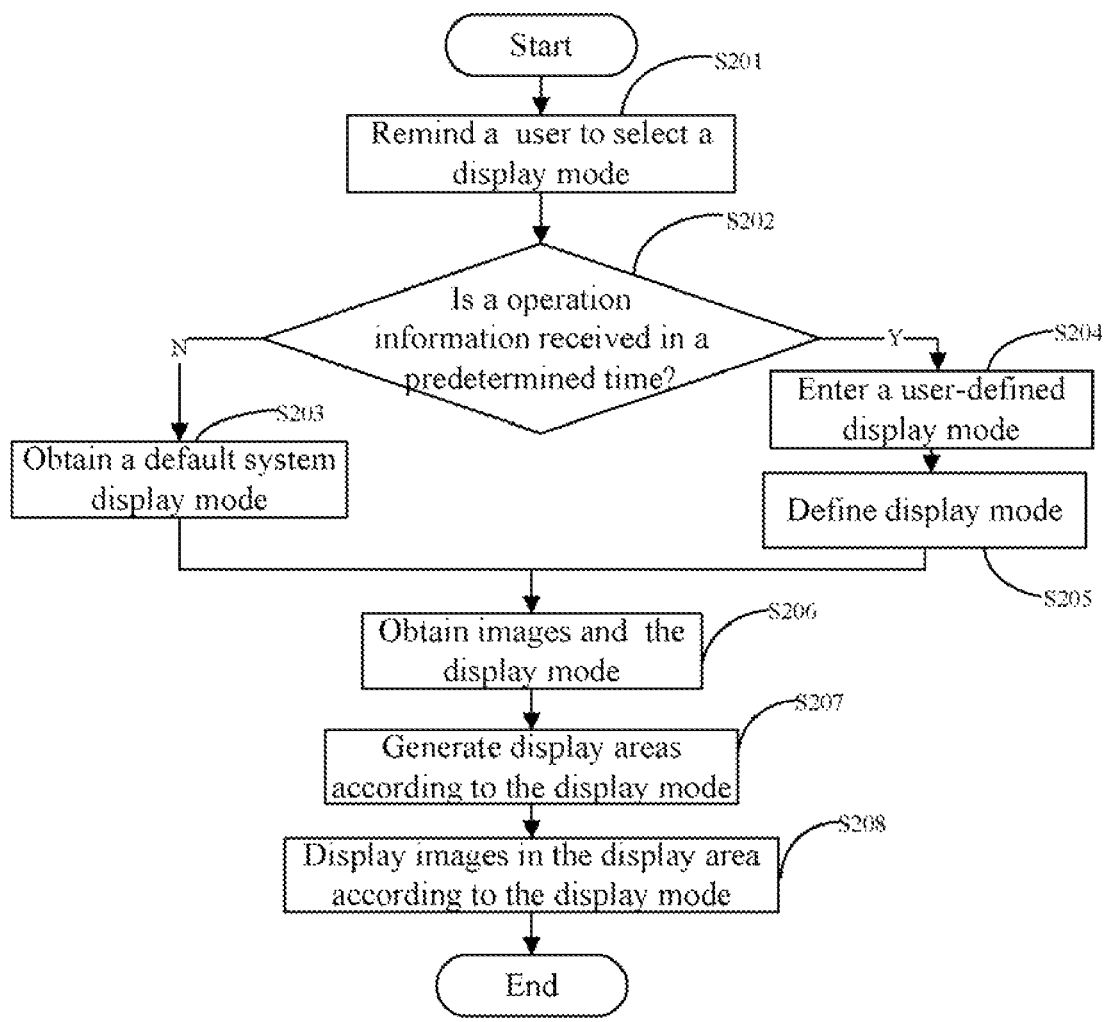
FIG. 2 is a flow chart for a method of displaying images asynchronously in accordance with an exemplary embodiment.

FIG. 2 is a flow-chart for a method of displaying image asynchronously applied in the digital photo frame of FIG. 1 in accordance with an exemplary embodiment.

In step S201, after being powered on, the digital photo frame reminds the user to select a display mode. For example, in the exemplary embodiment, the digital photo frame provides system default display modes and user-defined display modes for selection.

In step S202, the processor 12 determines whether it receives an operation instruction generated from the input unit 10 in a predetermined time, that is, the processor 12 determines whether the user selects a display mode in the predetermined time.

In step S203, if the processor 12 does not receive the operation information generated from the input unit 10, the processor 12 obtains the system default display mode, and the procedure goes to step S206 described below.

In step S204, if the processor 12 receives the operation instruction generated from the input unit 10, the processor 12 determines that the user wants to manually define the display mode.

In step S205, the processor 12 defines parameters of the display mode according to the operation information. For example, the processor 12 defines a total display area count displayable on the display 13 is 5, the interval to display images is 0.2 (S), and the predetermined displaying manner is displaying images in the display areas one-by-one according to the interval.

In the step S206, the reading module 121 obtains images and the display mode.

In step S207, the assigning module 123 generates display areas in the display according to the obtained display mode. Furthermore, the assigning module 123 assigns different frames to each of the display areas.

In step S208, the displaying module 123 displays the obtained images in the generated display areas according to the interval and the predetermined displaying manner.

Although the present invention has been specifically described on the basis of the exemplary embodiment thereof, the invention is not to be construed as being limited thereto. Various changes or modifications may be made to the embodiment without departing from the scope and spirit of the invention.

What is claimed is:

1. A digital photo frame (DPF) for displaying images asynchronously, comprising:
    a display;
    a memory for storing images and display modes, wherein each of the display modes defines a total display area count displayable on the display, an interval to display images, and a predetermined displaying manner; and
    a processor being connected with the memory and the display, comprising:
    a reading module configured for obtaining images and the display modes from the memory;
    an assigning module configured for defining one or more display areas according to the total display area count displayable on the display; and
    a displaying module configured for displaying the images according to the display mode.

2. The DPF as described in claim 1, wherein the predetermined displaying manner is selected from the group consisting of a manner of displaying images in the display areas one-by-one, and a manner of displaying images in the display areas in a first-in-first-out manner.

3. The DPF as described in claim 2, wherein if the display module has images that have not yet been displayed on the condition that all the display areas have images thereon, the display module clears up the images on all of the display areas, and displays the images that have not yet been displayed on the display areas.

4. The DPF as described in claim 2, wherein if the display module has images that have not yet been displayed on the condition that all the display areas have images thereon, the display module substitutes the images on the display areas with the images that have not yet been displayed.

5. The DPF as described in claim 1, wherein the memory is further configured for storing a plurality of default system images, if there are vacant display areas having no images displayed thereon after the display module displays a last image that has not yet been displayed, the reading module obtains one or more the default system images, and the display module displays the default system images on the vacant display areas.

6. The DPF as described in claim 1, wherein when the display module displays the last image that has not yet been displayed, the display module is further capable of displaying a prompt to remind the user that all the images have been displayed.

7. The DPF as described in claim 6, wherein the display module is further displaying another prompt to remind the user whether to repeat displaying images in the current display mode, if the processor does not receive any operation instructions in a predetermined time, the display module is capable of repeating displaying the images in the current image display mode, and if the processor receives the operation instruction in the predetermined time, the processor is capable of defining a new image display mode and the display module is capable of displaying the images according to the new image display mode.

8. The DPF as described in claim 1, further comprising an input unit being connected with the processor, wherein the input unit includes an image display parameters program for defining the display modes.

9. The DPF as described in claim 1, wherein each of the display areas is assigned with a different frame.

10. A method of displaying images asynchronously applied on a digital photo frame (DPF), comprising:
   providing at least one display mode, wherein each of the at least one display mode defines a total display area count displayable on a display, an interval to display images on a display of the DPF, and a predetermined displaying manner;
   obtaining images and a display mode;
   generating one or more display areas according to the display mode; and
   displaying the images on the generated display areas according to the interval and the predetermined displaying manner.

11. The method as described in claim 10, further comprising:
   providing a plurality of system default images; and
   if there are vacant display areas having no images displayed thereon after displaying a last image that has not yet been displayed, obtaining one or more the system default images, and displaying the system default images on the vacant display areas.

12. The method as described in claim 10, further comprising:
   displaying a prompt to remind the user that all the images have been displayed when the last image not yet displayed has been displayed.

13. The method as described in claim 12, further comprising:
   displaying another prompt to remind the user whether to repeat displaying the image in the current display mode, if no operation instruction has been received in a predetermined time, repeating to display images in the current display mode; and
   if receiving an operation instruction in the predetermined time, defining a new display mode according to the operation information, and displaying the images according to the new display mode.

14. The method as described in claim 10, wherein each of the one or more display areas is assigned with a different frame.

* * * * *